(12) United States Patent
Olrog

(10) Patent No.: US 9,755,917 B2
(45) Date of Patent: Sep. 5, 2017

(54) METHOD AND APPARATUS FOR SERVICE AWARE CHARGING AND CONTROL IN A COMMUNICATION NETWORK

(71) Applicant: Telefonaktiebolaget L M Ericsson (publ), Stockholm (SE)

(72) Inventor: Christian Olrog, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 146 days.

(21) Appl. No.: 14/653,577

(22) PCT Filed: Dec. 21, 2012

(86) PCT No.: PCT/SE2012/051481
§ 371 (c)(1),
(2) Date: Jun. 18, 2015

(87) PCT Pub. No.: WO2014/098686
PCT Pub. Date: Jun. 26, 2014

(65) Prior Publication Data
US 2016/0006621 A1    Jan. 7, 2016

(51) Int. Cl.
*H04L 12/24* (2006.01)
*H04L 12/16* (2006.01)
(Continued)

(52) U.S. Cl.
CPC ...... *H04L 41/5029* (2013.01); *H04L 12/1403* (2013.01); *H04L 12/1425* (2013.01);
(Continued)

(58) Field of Classification Search
None
See application file for complete search history.

(56) References Cited

U.S. PATENT DOCUMENTS

2004/0117311 A1    6/2004   Agarwal et al.
2010/0039941 A1*   2/2010   Tan et al. ............... H04L 12/14
                                                      370/241
(Continued)

FOREIGN PATENT DOCUMENTS

WO    WO 2008/025157 A1    3/2008
WO    WO 2009/141000 A1   11/2009
WO    WO 2011/072733 A1    6/2011

OTHER PUBLICATIONS

International Search Report, International Application No. PCT/SE2012/051481, Jan. 30, 2014.
(Continued)

*Primary Examiner* — Thomas Dailey
(74) *Attorney, Agent, or Firm* — Sage Patent Group

(57) ABSTRACT

A method and service aware charging controller for enabling service aware charging of access to a data service in a communication network. A request for a first data service is received and a first property of the request for the first data service is determined. Charging of the first data service is initiated using the first property. A request for a second data service is received and a second property of the request for the second data service is determined. It is further determined that the second data service is to be charged as a subordinate service of the first data service due to fulfillment of a condition based on the first and second property. Charging of the second data service as a subordinate service of the first data service is initiated.

23 Claims, 7 Drawing Sheets

(51) Int. Cl.
*H04L 12/14* (2006.01)
*H04M 15/00* (2006.01)
*H04L 12/26* (2006.01)

(52) U.S. Cl.
CPC .............. *H04L 12/16* (2013.01); *H04L 43/04* (2013.01); *H04M 15/61* (2013.01); *H04M 15/8214* (2013.01)

(56) References Cited

U.S. PATENT DOCUMENTS

| | | | |
|---|---|---|---|
| 2010/0198698 A1 | 8/2010 | Raleigh et al. | |
| 2012/0064878 A1* | 3/2012 | Castro Castro et al. | ............... H04L 12/14 455/418 |
| 2012/0087330 A1* | 4/2012 | Zhu et al. ............. | H04W 28/24 370/329 |
| 2012/0117220 A1* | 5/2012 | Mariblanca Nieves | ............... H04L 12/14 709/223 |
| 2012/0140620 A1* | 6/2012 | Hogan et al. ....... | H04L 41/0893 370/230 |
| 2012/0144049 A1* | 6/2012 | Lopez Nieto et al. | ............... H04L 12/14 709/228 |
| 2013/0212265 A1* | 8/2013 | Rubio Vidales et al. | ............... H04L 12/14 709/224 |

OTHER PUBLICATIONS

Written Opinion of the International Searching Authority, International Application No. PCT/SE2012/051481, Jan. 30, 2014.
3GPP, Technical Specification, "3rd Generation Partnership Project; Technical Specification Group Services and System Aspects; Policy and charging control architecture (Release 11)", 3GPP TS 23.203 V11.8.0 (Dec. 2012), 179 pp.
3GPP, Technical Specification, "3rd Generation Partnership Project; Technical Specification Group Services and System Aspects; Telecommunication management; Charging management; Charging architecture and principles (Release 11)", 3GPP TS 32.240 V11.5.0 (Sep. 2012), 44 pp.
European Office Action Corresponding to European Patent Application No. 12 890 256.6; Dated: Nov. 3, 2015; 10 Pages.
Northcutt et al. "Stateful Firewalls" In: "Inside Network Perimeter Security", Apr. 3, 2005, Sams Publishing, pp. 55-86.

* cited by examiner

METHOD AND APPARATUS FOR SERVICE AWARE CHARGING AND CONTROL IN A COMMUNICATION NETWORK

CROSS REFERENCE TO RELATED APPLICATION

This application is a 35 U.S.C. §371 national stage application of PCT International Application No. PCT/SE2012/051481, filed on 21 Dec. 2012, the disclosure and content of which is incorporated by reference herein in its entirety. The above-referenced PCT International Application was published in the English language as International Publication No. WO 2014/098686 A1 on 26 Jun. 2014.

TECHNICAL FIELD

The present invention relates to service control in a communication network and more particularly to a method and apparatus for service aware charging and control.

BACKGROUND

Mobile Broadband Charging (MBC) solutions covers convergent data rating, charging and policy management providing operators with a platform for advanced real-time charging of data services along with policy control functions.

MBC implements functionality defined in the Online Charging System (OCS) as defined in 3GPP TS 32.240 V11.5.0 (2012-09). MBC also implements functionality defined in the Policy and Charging Rules Function (PCRF) as described in 3GPP TS 23.203 V11.8.0 (2012-12), this way creating a way of combining policy management and charging. MBC implements bearer quality of service (QoS) control as an integral part of rating. If during rating evaluation subscriber's subscription and/or temporary offers, subscriber's accumulated usage, day of week time of day, radio access type, equipment type, location or other parameter indicates that the QoS must be changed for this subscriber, MBC enforces the new QoS towards the packet core network.

Service aware charging and control solution provides for traffic inspection, charging, QoS management, content filtering and access policies.

Service aware charging and control includes capturing and analyzing the subscriber data traffic and performing charging and control functions. Subscriber traffic is obtained by defining a default gateway for intermediate network elements, both uplink and downlink.

The default gateway is deployed in the operator's IP network and captures the user and signaling traffic. By analyzing and classifying that traffic, the default gateway is aware of the subscriber's identity and the type of service being used, with no need for changes in either the subscriber terminals or the service platforms. The default gateway provides packet inspection and service classification where IP packets are classified into content types according to a configured rules, so that they are assigned to a particular service session. The default gateway may interact with an OCS for control of service sessions for online charged, e.g. prepaid subscribers.

With service based mobile broadband charging attractive pricing packages can therefore be provided to an end users giving access to a specific service. For example, pricing package such as access to Facebook for 1 day for the price of 3 EUR can be offered.

However, proper control of such services is troublesome in terms of service creation as the requested service often results in a response from the service providing system that includes references (e.g. web links) to other secondary sources.

A concrete example is facebook.com. It includes a lot of content from facebook.com—but it also includes "facebook applications" which may be HTML iframes loaded from secondary sources (with Uniform Resource Locators which are not related to facebook.com). These iframes are automatically loaded by the web browser. Such references could relate to images, advertisements, or other content. The user expects access to such references to be included in the price package but the default gateway is not able to distinguish this traffic from other traffic.

Present solutions also have limitations in terms of scalability as the capturing of, and analyzing, traffic by the default gateway requires costly processing capacity.

SUMMARY

It is an object of the invention is to provide a method and apparatus for enabling service aware charging of access to a data service in a communication network mitigating the problem of controlling charging of access to referenced sources.

One aspect of the invention relates to a method for enabling service aware charging of access to a data service in a communication network. A request for a first data service is received and a first property of the request for the first data service is determined. Charging of the first data service is initiated using the first property. A request for a second data service is received and a second property of the request for the second data service is determined. It is further determined that the second data service is to be charged as a subordinate service of the first data service due to fulfillment of a condition based on the first and second property. Charging of the second data service as a subordinate service of the first data service is initiated.

It is an advantage of the invention that a second data service may be charged as a subordinate service of a first data service due to fulfillment of a condition such that charging of the second data service as a subordinate service of the first data service can be initiated. Data services can therefore be charged and permitted to function as intended by a service provider.

Another aspect of the invention relates to a service aware charging controller for enabling service aware charging of access to a data service in a communication network. The service aware charging controller comprises an interface unit adapting the service aware charging controller for receiving a request for a first data service. It further comprises a controller unit adapting the service aware charging controller for determining a first property of the request for the first data service and to initiate charging of the first data service using the first property. The interface unit is adapting the service aware charging controller for receiving a request for a second data service. The controller unit is adapting the service aware charging controller for determining a second property of the request for the second data service, determining that the second data service is to be charged as a subordinate service of the first data service due to fulfillment of a condition based on the first and second property and initiate charging of the second data service as a subordinate service of the first data service.

Embodiments of the invention will now be described in more detail with reference to the enclosed drawings.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
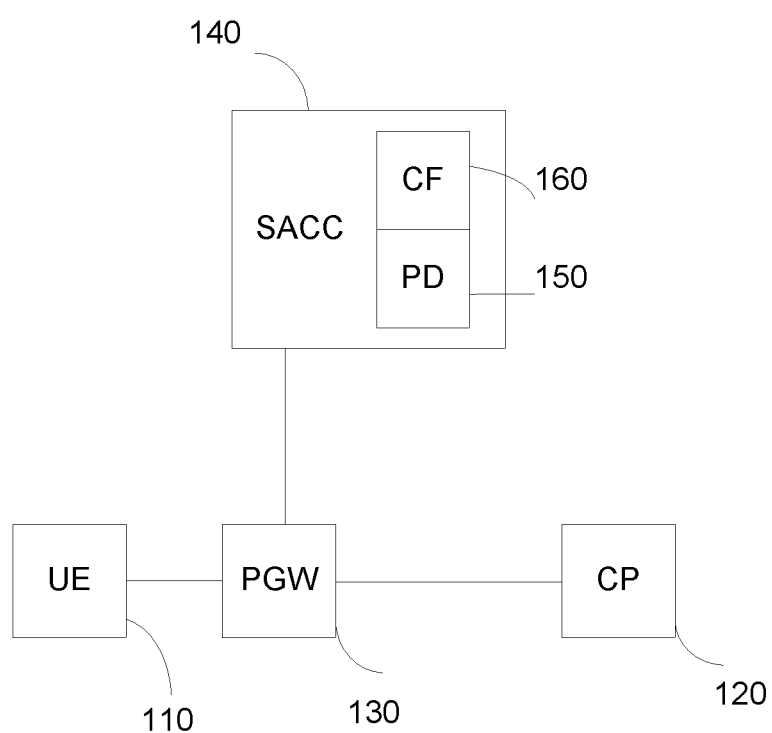
FIG. 1 is a block diagram showing the basic network structure of a system for service aware charging and control.

FIG. 1 is a block diagram showing the basic network structure of a system for service aware charging and control.

User Equipment (UE) 110 connects to the communication network using an access network such as for example GPRS, UMTS/WCDMA, CDMA, CDMA2000, Wireless Fidelity (WiFi), Worldwide Interoperability for Microwave Access (WiMax), Digital Subscriber Line (DSL), cable.

Traffic from the UE via the access network to a Content Provider (CP) 120 is handled by a Packet Gateway (PGW) 130 for example a Gateway GPRS Support Node (GGSN) or an Evolved Packet Gateway (EPG). Subscriber traffic is routed to the PGW by defining the PGW as default gateway for intermediate network elements, both uplink and downlink.

A Service Aware Charging Controller (SACC) 140 is connected to the PGW using for example an SGi interface and is arranged to capture and analyze the subscriber data traffic and performing charging and control functions including traffic inspection, charging, QoS management, content filtering and access policies.

The SACC is arranged for enabling service aware charging of access to a data service provided by the CP. The SACC is adapted for receiving a request for a first data service and determines a first property of the request for the first data service using a Property Determinator (PD) 150. This property may be the CP address, e.g. a Uniform Resource Indicator (URI), but may also be a classification of the service obtained by analyzing the received request. The property may also be a time stamp of the received request, e.g. a Hyper Text Transfer Protocol (http) GET request. The SACC then initiates the Charging Function (CF) 150 for charging of the first data service using the first property. The UE may after having received a response including referenced content from the CP initiate the acquisition of such content. Thus, when the UE is requesting this referenced content the SACC is receiving a second request as a second data service. The PD may now determine a second property of the request for the second data service. This property may again be a content provider address, e.g. URI, now the content provider of the referenced content. It may also be a classification of the service, or a time stamp of the request.

The SACC may now determine that the second data service is to be charged as a subordinate service of the first data service due to fulfillment of a condition based on the first and second property. An example of such condition is that the content provider address is included among the addresses to providers for the referenced content included in the response from the initial content provider, for example in a list of addresses, e.g. URI's stored by the PD. Another example is that the service class of the second request is defined as being part of a same service package as the first request.

The SACC may then initiate charging of the second data service as a subordinate service of the first data service using the CF.

The SACC can be integrated into an Online Charging System or located in a packet inspection node such as a Deep Packet Inspection Node, or located within the PGW.

The SACC may include the PD as a system component that performs Open Systems Interconnection (OSI) layer 7 inspection of content downloaded from a service and adds referenced secondary sources to a temporary special list and allows the charging system to include any traffic to these secondary sources in the base service charge based on that they are accessed thru reference from the primary service.

A concrete example is social network content providers such as facebook.com. It includes a lot of content from facebook.com—but it also includes "facebook applications" which are HTML "iframes" loaded from secondary sources, with Uniform Resource Locator's (URL) not related to facebook.com. These iframes are automatically loaded by the web browser.

Several other examples exist—including embedded video clip such as Youtube objects.

Another optional quick method (layer 7 inspection can reduce overall performance) is to apply heuristical measures and classify http requests which are following a standard web browser access patterns in a short time period after the first reply from the selected service. (e.g. in http 1.1 a web browser client supports max 2 open TCP channel requests per domain (e.g. web server), each request optionally supports pipelining of http requests—and the downloads can not start before the original response has been sent to client).

The short time period may correspond to the time need to decode an html page, say 100 milliseconds, but can range from 50-200 milliseconds. 100 milliseconds may also be a reasonable value for subsequent requests restricted by the http 1.1. requirement that only two TCP requests per domain is allowed. In that case the time is measured from response for a request (n−1) to the arrival of a new request (n).

Since the quick method could be outsmarted it is possible to combine the inspection method and the quick method by performing inspection method for a certain percentage of quick method executions—potentially also by adding heuristical analysis trying to identify users having small scripts that fake "facebook" service loading just before loading a service of their choice. Upon detecting a fraudulent user the service can be shut off.

The SACC and in particular the PD may be located in for example an Evolved Packet Gateway but it could also reside in any additional node in the network performing flow classification and offering this information to the CF.

The quick method could be implemented in the CF and located in a charging system (e.g. rating system) such as an OCS by looking at timestamps of requests, potentially even at a later time. That way analysis of the timestamps at a later time may be used to refund if it is deemed that content was from a special service.

A further optimization and tradeoff that can be utilized is limiting the correlated items to images, css, javascript or video clip resources only and assuming that only content-type text/html are primary requests and all requests for resources close in time are related requests.

Figure 2:
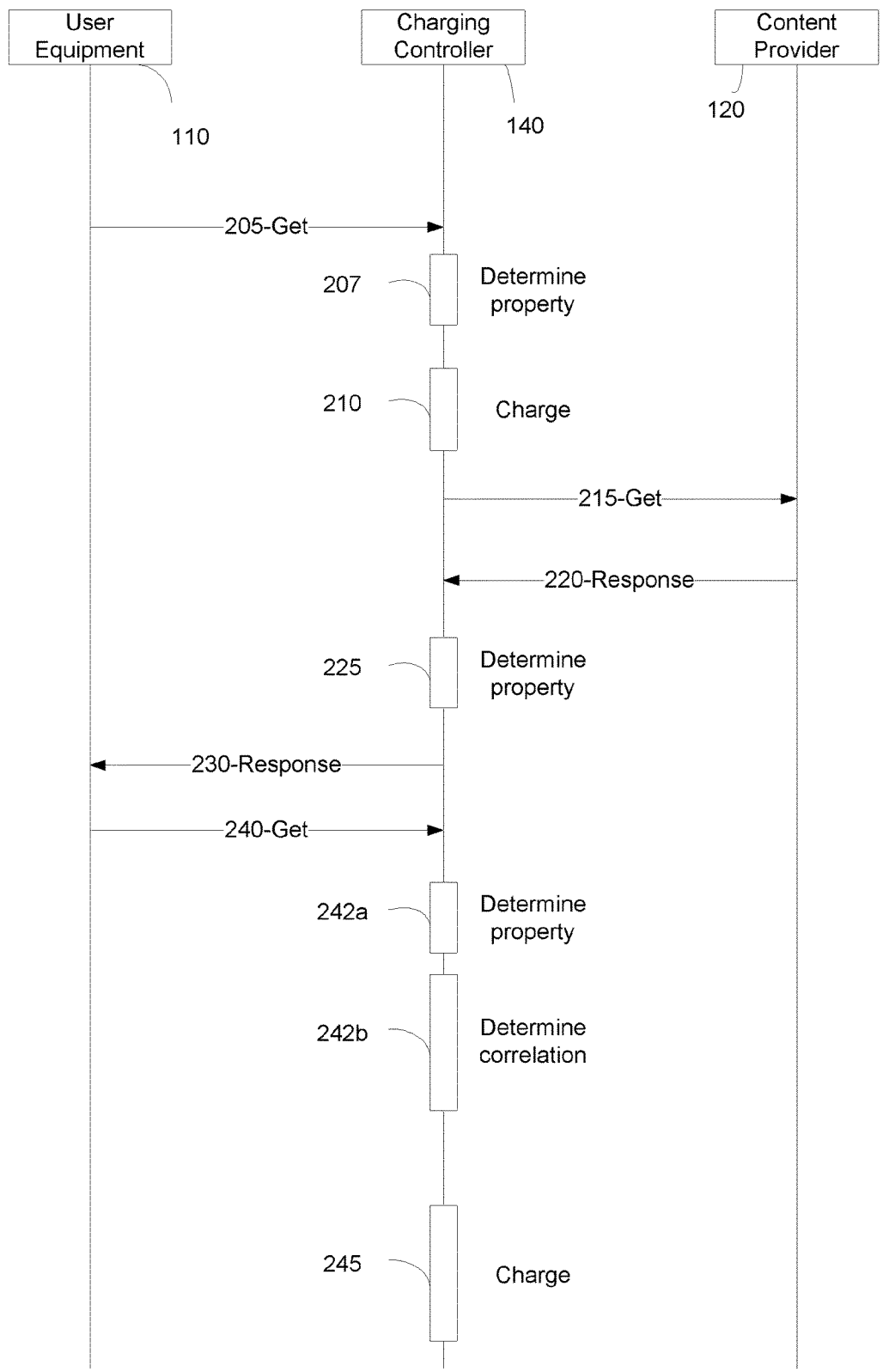
FIG. 2 is a message sequence chart showing a service aware charging control according to an exemplary embodiment of the invention.
Figure 3:
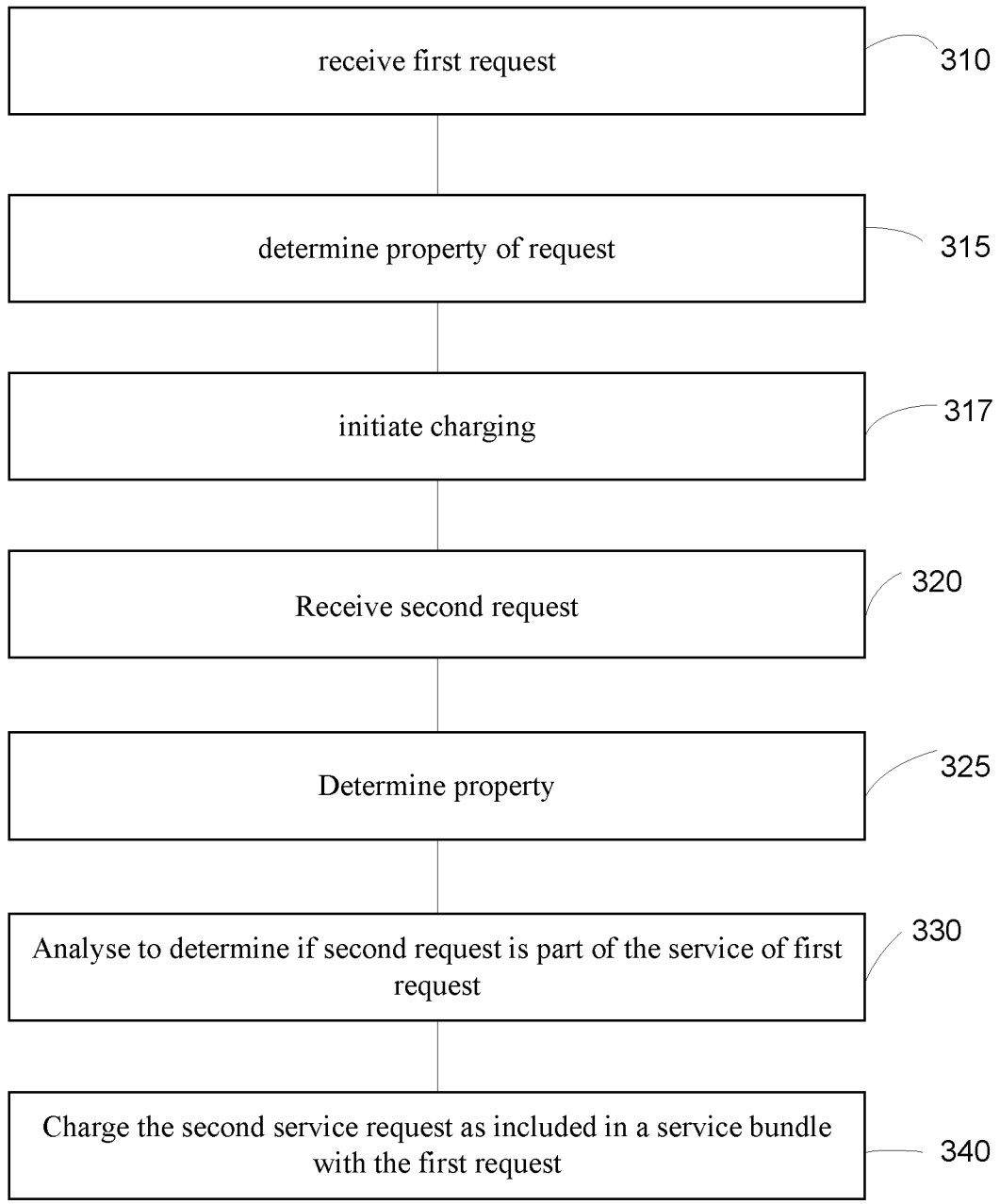
FIG. 3 is a flowchart showing a method performed by a Service Aware Charging Controller.

FIG. 2 is a message sequence chart showing a service aware charging control according to an exemplary embodiment of the invention and FIG. 3 is a flowchart showing a method performed by a Service Aware Charging Controller.

The method for enabling service aware charging of access to a data service in a communication network starts with the Service Aware Charging Controller receiving a request, e.g. a http GET message, for a first data service from the User Equipment in step 205/310.

In step 207/315 a property of the request for the first data service is determined by the SACC. Determining the property may include performing an inspection of the content of the request for the first data service and determine the content provider address, or determine a classification of the service to be used for charging.

The inspection, e.g. packet inspection, is as an option performed only if the traffic of received requests for data service conforms to a specific traffic pattern, otherwise correlation of requests based on time difference between requests may suffice.

In one alternative of the present solution, the step of performing an inspection is performed only when the received request for a first data service conforms to a defined traffic characteristic.

In order to e.g. prevent auto reload script on data services, such as facebook, which could allow the user to non-charged download of data not intended to be charged within the same service package, the packet inspection may be based on a mechanism randomly selecting a user or request to inspect. Such selection can be made with a low frequent random inspection testing per user.

Charging of the first data service using the property is initiated in step 210/317. The initiation of charging may include a parameter including an URI, i.e. a string of characters used to identify a name or a resource, of a service provider, or a service classification of the data service.

The method may include a step 220 of receiving a response message from the requested first data service from a content provider and a step 225 analyzing the response message to detect the occurrence of referenced content, e.g. secondary links, and determining a property, e.g. service type of referenced content, in response from CP of the detected referenced content. The property may include a list of addresses to referenced content.

If the response message was received in step 220 the received content is forwarded to the UE in step 230.

In step 240/320 the SACC is receiving a request for a second data service.

A property of the request for the second data service is determined in step 242a/325 which may include an address of the second data service.

The method continues in step 242b/330 with correlating the first and second request by determining that the second data service is to be charged as a subordinate service of the first data service due to fulfillment of a condition based on properties if the first and second request for data service. The condition may comprise that the properties indicates that the content requested in the second request for data service is related to the content indicated by the properties determined from the response in step 220.

As an example, the property of the second request may be the service type. As a further example, the property of the second request indicates that the content requested in the second request for data is related to the content indicated by the property of the response in step 220 if the address of the second data service is included in the list. Further, the condition may comprise that the time difference between the request for the first data service and the request for the second data service does not exceed a threshold value. The threshold value may be dynamically determined depending on when the requested content was downloaded or based on the connection speed.

The property of the first request may also include a first time stamp of the request for the first data service, the property of the response in step 220 includes a second time stamp of the request for the second data service and the condition comprises that the difference between the first and second time stamp is less than a threshold value; and/or a traffic characteristic of the request for the first and second data services conforms to a defined traffic pattern. Such a defined traffic pattern may be for example that maximum two Transmission Control Protocol (TCP) requests per domain is allowed in http 1.1, or that a burst of requests (for the links included in the main request) follows within a short delay. Such delay may be in the range of 50-200 milliseconds, often around 100 milliseconds.

The step of determining that the second data service is to be charged as a subordinate service of the first data service is performed may as an option be performed only if the properties of the first and/or second request for data service indicates that the requested data service relates to one or more of an image, cascading style sheets or javascript resource.

Charging of the second data service as a subordinate service of the first data service is then initiated by the SACC in step 245/340. The initiation of charging may include as a parameter a uniform resource indicator of a service provider, or a service classification of the data service.

For offline charging, a charging record including an URI and time stamp is sufficient to accurately charge the services as no real time control is applied. Therefore, charging may be initiated based on an address such as the URI of the first data service included as a property of the first request for data service, and the first time stamp.

Figure 4:
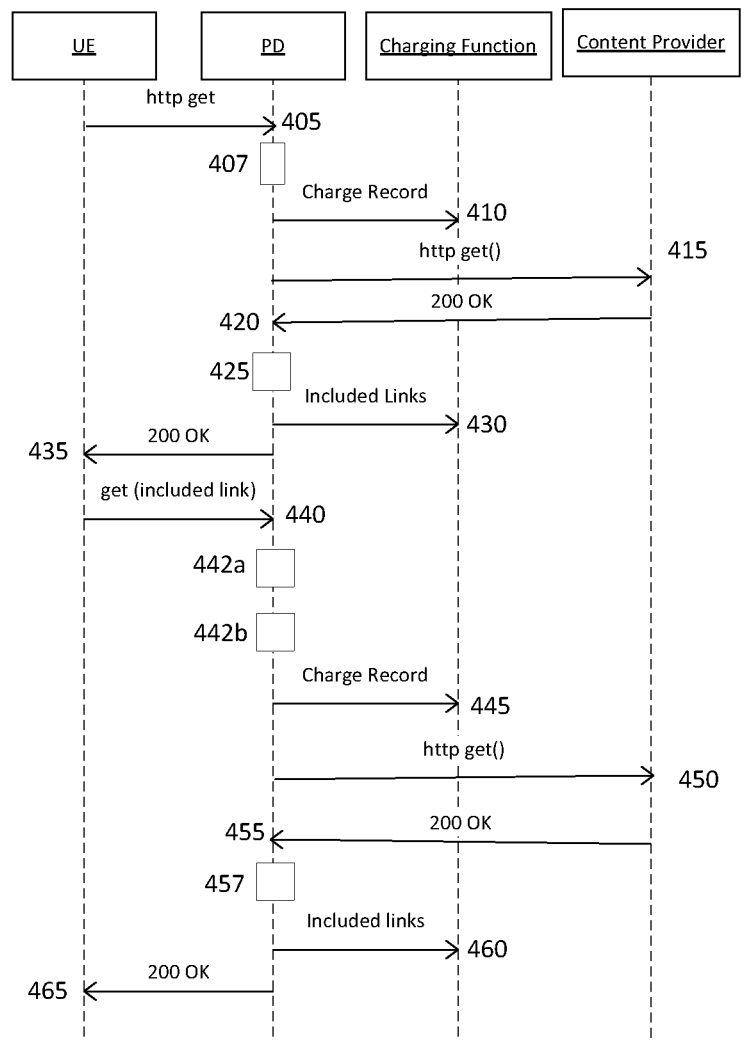
FIG. 4 is a message sequence chart showing service aware charging control using packet inspection according to an exemplary embodiment of the invention.

FIG. 4 is a message sequence chart showing service aware charging control using packet inspection according to an exemplary embodiment of the invention.

In step 405 the UE requests a data service such as web page from a Content Provider by sending a http GET message which is received by the Packet Determinator.

The PD analyses the request to determine its properties, e.g. CP address, in step 407 and sends a charging request to CF in step 410.

Both online and offline charging is possible. That is, for blocking traffic in realtime online control is needed—but for charging only, off line data record generation may suffice. For offline charging, URI and time stamp of the received request is sufficient to charge when using heuristic, e.g. time based, determination of whether subsequent requests for data services are related.

For online charging, the PD may use a Diameter protocol towards the CF and the charging request may be a credit control request including a Request for Resource Usage according to 3GPP TS 32.299. For controlling, e.g. blocking, traffic based on charging function determination, the PD will await a credit control response message from the CF.

The request for charging may include an http address, a service classification applied by the packet inspection of the PD, or any other property to be used for rating.

The request for the web page is received as an http GET message by the CP in step 415 which returns a page with direct (e.g. images, frames, javascript) and indirectly (explicit clickable links or buttons) referenced content in a 200 OK message in step 420.

Upon receipt of the 200 OK message the PD function analyze the content in step 425 to determine its properties and reports back any direct and indirect links to the charging system so that it may rate and or charge the content in a specific manner (e.g. service based charging). A direct link may be a link in the html page while an indirect link may be an http redirect (e.g. using a BitLy shortened address). Service based charging relates to the service provided by the content provider—e.g. "facebook" is to be charged as one service package irrespective of whether the facebook page contains referenced information.

In step 430, either the links can be send for rating, or the service classifications ("tags") determined by the packet inspection by the PD can be sent for the rating and charging. For controlling traffic based on charging function determination, the PD will await a credit control response message from the CF.

It is an advantage that the rating can be done by the CF in advance of the next request to come, and also the packet inspection is done in advance (and result cached/stored), which saves resources.

In step 435 the content from the CP is forwarded in a 200 OK message to the UE.

A subsequent request based on the first request is rated and charged as part of the first request based on the knowledge about which links were included in the retrieved page. Charged as part means that e.g. it is a part of a bundle service that is charged. The charging can be free or non-free, i.e. charged at a cost.

In step 440 the UE again requests a data service such as web page from a Content Provider by sending a http GET message which is received by the Packet Determinator.

The PD analyses the request in step 442a to determine its properties, e.g. CP address, In step 442b the PD determines that the second data service is to be charged as a subordinate service of the first data service due to fulfillment of a condition based on properties of the first and second request for data service. If packet inspection is used the incoming request is included in the list of earlier links. The condition may also include that a time delay has not been exceeded, e.g. only access to data services relating to referenced content are included during the same hour or day.

The DP and sends a charging request to CF in step 445 to initiate charging of the second data service as a subordinate service of the first data service.

In step 450 the http GET request for the web page is received by the CP which returns a page with direct (e.g. images, frames, javascript) and indirectly (explicit clickable links or buttons) referenced content in a 200 OK message in step 455.

The content is analyzed by the PD in step 457

In step 460, either the links can be send for rating, or the service classifications ("tags") determined by the packet inspection by the PD can be sent for the rating and charging.

The referenced content may then be sent to the UE in a 200 OK message in step 465.

Figure 5:
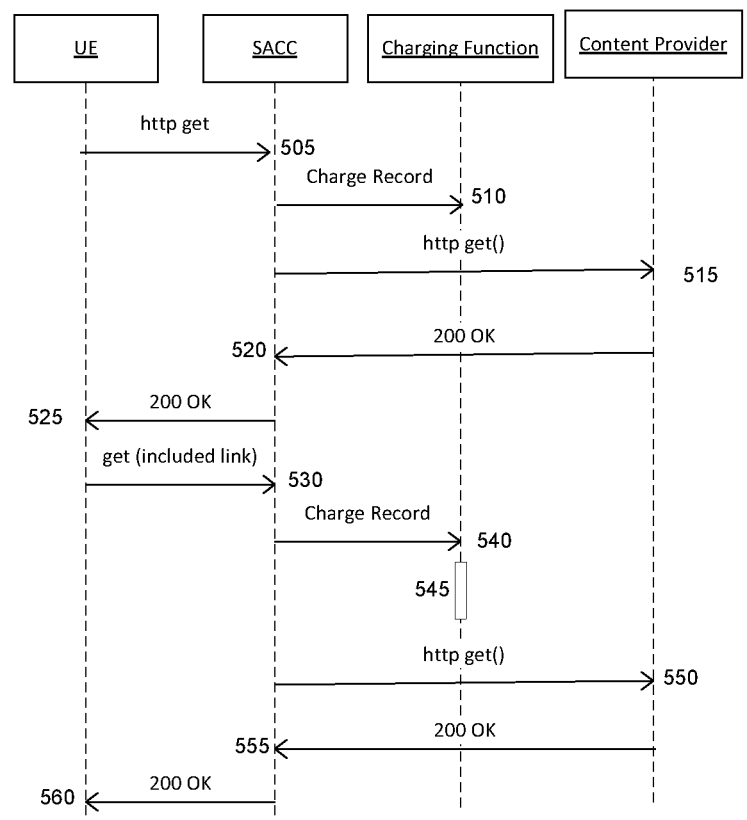
FIG. 5 is a message sequence chart showing service aware charging control using time based correlation located a the charging function according to an exemplary embodiment of the invention.

FIG. 5 is a message sequence chart showing service aware charging control using time based correlation located a the charging function according to an exemplary embodiment of the invention.

In the method described in FIG. 5 no packet inspection is taking place and the included links are unknown by the SACC. Instead, the Charging Function tries to correlate the second request to the first request based on time and http client behavior rules. If the second request is judged to be related to the first request then it may be rated and charged for as part of the service based charging package even if the URL does not match the directly requested service (e.g. initial request is for facebook.com and subsequent request is for an image from adcontent.com)

In step 505 the UE requests a data service such as web page from a Content Provider by sending a http GET message which is received by the SACC.

The SACC sends a charging request to CF in step 510.

Both online and offline charging communication is possible. That is, for blocking traffic in real time online control is needed—but for charging only, off line data record generation may suffice. For offline charging, URI and time stamp of the received request is sufficient to charge when using heuristic, e.g. time based, determination of whether the requests for data services are related.

For online charging, the SACC may use a Diameter protocol towards the CF and the charging request may be a credit control request including a Request for Resource Usage according to 3GPP TS 32.299. For controlling, e.g. blocking, traffic based on charging function determination, the SACC will await a credit control response message from the CF.

The request for the web page is received by the CP in step 515 which returns a page with direct (e.g. images, frames, javascript) and indirectly (explicit clickable links or buttons) referenced content in a 200 OK message in step 520.

In step 525 the content from the CP is forwarded in a 200 OK message to the UE.

In step 530 the UE again requests a data service such as web page from a Content Provider by sending a http GET message which is received by the SACC.

The SACC and sends a charging request to CF in step 540 to initiate charging of the second data service as a subordinate service of the first data service.

The CF analyses the request in step 545 to determine its properties, e.g. determine charge record time stamp of the first request in step 510 and correlate with a time stamp of the second request in step 540. It is determined that the second data service is to be charged as a subordinate service of the first data service due to fulfillment of a condition based on properties of the first and second request for data service. If heuristic determination is used, e.g. time based, a subsequent request is considered based on the main request if a very small time delay, say around 100 ms, has passed and that the subsequent request follows an anticipated model. Such model can be that a burst of requests (for the links included in the main request) follows within the short 100 ms delay. The determination may also be performed based on time stamp of the receipt of the request for the first and second data service in step 505 and 530 respectively.

In step 550 the http GET request for the web page is received by the CP which returns a page with direct (e.g. images, frames, javascript) and indirectly (explicit clickable links or buttons) referenced content in a 200 OK message in step 555.

The referenced content may then be sent to the UE in a 200 OK message in step 560.

Figure 6:
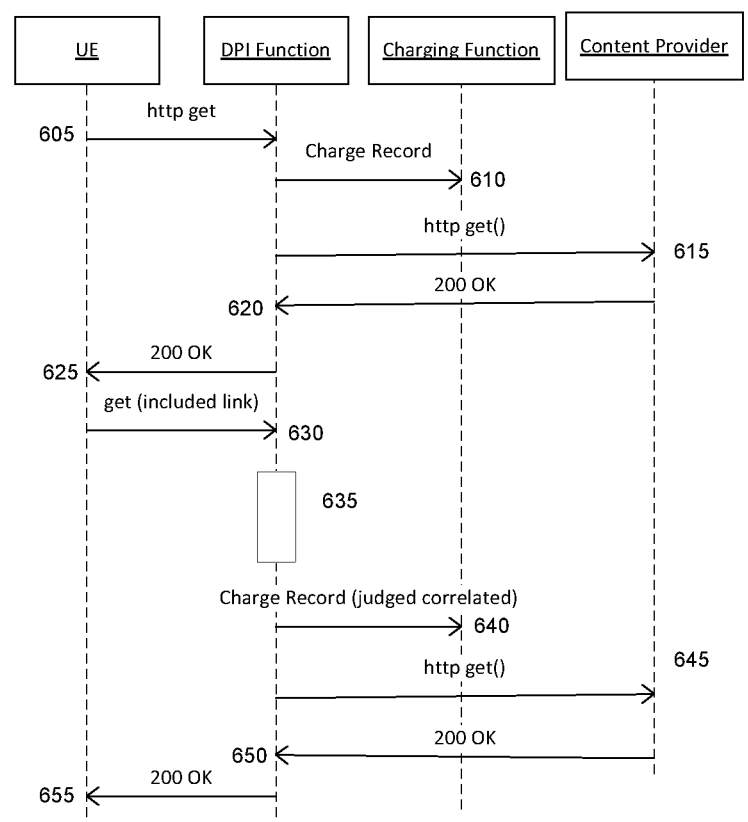
FIG. 6 is a message sequence chart showing service aware charging control using time based correlation located in a packet inspection function according to an exemplary embodiment of the invention.

FIG. 6 is a message sequence chart showing service aware charging control using time based correlation located in a packet inspection function according to an exemplary embodiment of the invention.

An alternate solution locates the time correlation function into the SACC and uses full (but performance costly) packet inspection by the PD only part of the time.

The choice between heuristic and packet inspection may be done dynamically based on traffic characteristic. In that case, the heuristic determination is located in the PD node.

In step 605 the UE requests a data service such as web page from a Content Provider by sending a http GET message which is received by the SACC.

The SACC sends a charging request to CF in step 610.

Both online and offline charging communication is possible. That is, for blocking traffic in real time online control is needed—but for charging only, off line data record generation may suffice. For offline charging, the URI and time stamp of the received request is sufficient to charge when using heuristic, e.g. time based, determination of whether requests for data services are related.

For online charging, the SACC may use a Diameter protocol towards the CF and the charging request may be a credit control request including a Request for Resource Usage according to 3GPP TS 32.299. For controlling, e.g. blocking, traffic based on charging function determination, the SACC will await a credit control response message from the CF.

The request for the web page is received by the CP in step 615 which returns a page with direct (e.g. images, frames, javascript) and indirectly (explicit clickable links or buttons) referenced content in a 200 OK message in step 620.

In step 625 the content from the CP is forwarded in a 200 OK message to the UE.

In step 630 the UE again requests a data service such as web page from a Content Provider by sending an http GET message which is received by the SACC.

The SACC analyses the request in step 635 to determine its properties, e.g. determine time stamp of the first request in step 605 and correlate with a time stamp of the second request in step 625. It is determined that the second data service is to be charged as a subordinate service of the first data service due to fulfillment of a condition based on properties of the first and second request for data service. If heuristic determination is used, e.g. time based, a subsequent request is considered based on the main request if a very small time delay, say around 100 ms, has passed and that the subsequent request follows an anticipated model. Such model can be that a burst of requests (for the links included in the main request) follows within the short 100 ms delay.

The SACC sends a charging request to CF in step 640 to initiate charging of the second data service as a subordinate service of the first data service, having been judged correlated.

In step 645 the http GET request for the web page is received by the CP which returns a page with direct (e.g. images, frames, javascript) and indirectly (explicit clickable links or buttons) referenced content in a 200 OK message in step 650.

The referenced content may then be sent to the UE in a 200 OK message in step 655.

The heuristical, e.g. time stamp based, methods—whether located in a SACC or distributed to an external charging system (e.g. Online Charging System) is efficient with reasonable tradeoff in security (financial revenue loss—not increased expenditures loss) and computing resource consumption.

Figure 7:
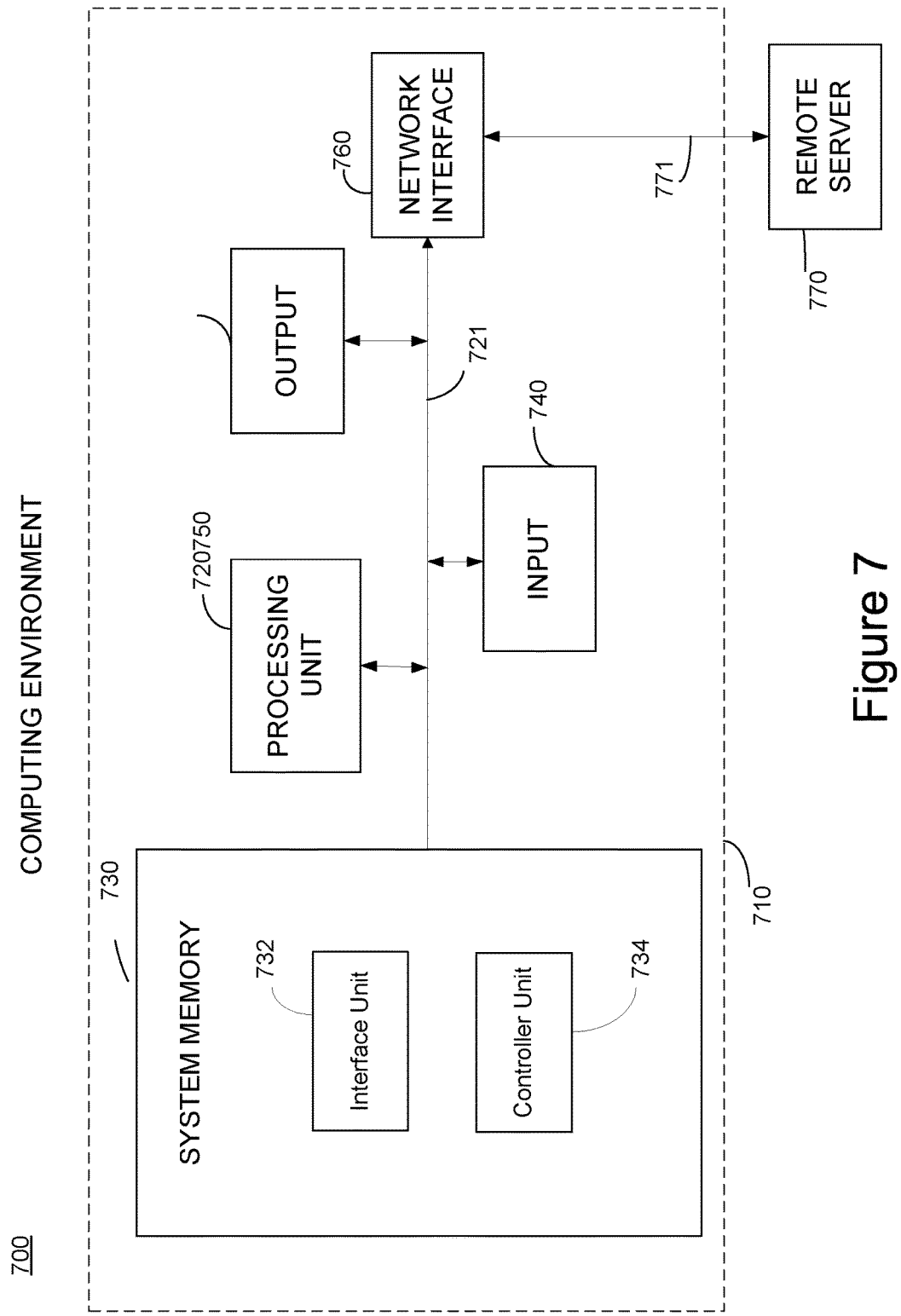
FIG. 7 is a block diagram showing an exemplary embodiment of a Service Aware Charging Controller in the form of computing system environment for implementing a Service Aware Charging Controller.

FIG. 7 is a block diagram showing an exemplary embodiment of a Service Aware Charging Controller in the form of computing system environment for implementing a Service Aware Charging Controller 700.

Although as made clear above, the computing system environment 700 is only one example of a suitable computing environment for a service aware charging controller and is not intended to suggest any limitation as to the scope of use or functionality of the claimed subject matter. Further, the computing environment 700 is not intended to suggest any dependency or requirement relating to the claimed subject matter and any one or combination of components illustrated in the example operating environment 700.

An example of a device for implementing the previously described innovation includes a general purpose computing device in the form of a computer 710. Components of computer 710 can include, but are not limited to, a processing unit 720, a system memory 730, and a system bus 721 that couples various system components including the system memory to the processing unit 720. The system bus 721 can be any of several types of bus structures including a memory bus or memory controller, a peripheral bus, and a local bus using any of a variety of bus architectures.

Computer 710 can include a variety of computer readable media. Computer readable media can be any available media that can be accessed by computer 710. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media can embody computer readable instructions, data structures, program modules or other data in a modulated data signal such as a carrier wave or other transport mechanism and can include any suitable information delivery media.

The system memory 730 can include computer storage media in the form of volatile and/or nonvolatile memory such as read only memory (ROM) and/or random access memory (RAM). A basic input/output system (BIOS), containing the basic routines that help to transfer information between elements within computer 710, such as during start-up, can be stored in memory 730. Memory 730 can also contain data and/or program modules that are immediately accessible to and/or presently being operated on by processing unit 720. By way of non-limiting example, memory 730 can also include an operating system, application programs, other program modules, and program data.

In some embodiments the steps of the algorithm or method performed by the invention is implemented as software modules loaded in the memory and processable by the processing unit, adapting the computing system environment for executing the steps of the algorithm or method described.

In one embodiment an interface unit 732 is a software module loaded in the memory and processable by the processing unit, adapting the service aware charging controller for receiving a request for a first data service. The memory further comprises a controller unit 734 as a software module loaded in the memory and processable by the processing unit, adapting the service aware charging controller for determining a first property of the request for the first data service and to initiate charging of the first data service using the first property. The interface unit is adapting the service aware charging controller for receiving a request for a second data service. The controller unit is adapting the service aware charging controller for determining a second property of the request for the second data service, determining that the second data service is to be charged as a subordinate service of the first data service due to fulfillment of a condition based on the first and second property and initiate charging of the second data service as a subordinate service of the first data service.

The computer 710 can also include other removable/non-removable and volatile/nonvolatile computer storage media. For example, computer 710 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 721 through a non-removable memory interface such as an interface, and a magnetic disk drive or optical disk drive can be connected to the system bus 721 by a removable memory interface, such as an interface.

A user can enter commands and information into the computer 710 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 720 through user input 740 and associated interface(s) that are coupled to the system bus 721, but can be connected by other interface and bus structures, such as a parallel port, game port or a universal serial bus (USB).

A graphics subsystem can also be connected to the system bus 721. In addition, a monitor or other type of display device can be connected to the system bus 721 through an interface, such as output interface 750, which can in turn communicate with video memory. In addition to a monitor, computers can also include other peripheral output devices, such as speakers and/or printing devices, which can also be connected through output interface 750.

The computer 710 can operate in a networked or distributed environment using logical connections to one or more other remote computers, such as remote server 770, which can in turn have media capabilities different from device 710. The remote server 770 can be a personal computer, a server, a router, a network PC, a peer device or other common network node, and/or any other remote media consumption or transmission device, and can include any or all of the elements described above relative to the computer 710. The logical connections depicted in FIG. 7 include a network 771, such as a local area network (LAN) or a wide area network (WAN), but can also include other networks/buses.

When used in a LAN networking environment, the computer 710 is connected to the LAN 771 through a network interface or adapter. When used in a WAN networking environment, the computer 710 can include a communications component, such as a modem, or other means for establishing communications over a WAN, such as the Internet. A communications component, such as a modem, which can be internal or external, can be connected to the system bus 721 through the user input interface at input 740 and/or other appropriate mechanism.

In a networked environment, program modules depicted relative to the computer 710, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method for enabling service aware charging of access to a data service in a communication network comprising:
   receiving a request for a first data service;
   determining a first property of the request for the first data service;
   initiating charging of the first data service using the first property;
   receiving a request for a second data service;
   selecting between a packet inspection for the request for the second data service and a heuristic inspection for the request for the second data service, wherein the packet inspection comprises analyzing a response message received in response to the request for the first data service and analyzing the response message to detect the occurrence of referenced content requested in the request for the second data service, and wherein the heuristic inspection comprises determining that a time difference between the request for the first data service and the request for the second data service does not exceed a threshold value;
   determining, based on the selected heuristic inspection or the selected packet inspection, that the second data service is to be charged as a subordinate service of the first data service; and
   initiating charging of the second data service as a subordinate service of the first data service.

2. The method according to claim 1 wherein the determining the first property of the request for the first data service includes performing an inspection of the content of the request for the first data service, the method further comprising:
   receiving a response message from the requested first data service; and
   analyzing said response message to detect the occurrence of referenced content and determining a third property of the detected referenced content;
   wherein the condition comprises that the second property indicates that the content requested in the second request for data service is related to the content indicated by the third property.

3. The method according to claim 2 wherein the initiation of charging of the first and/or second data services includes a uniform resource indicator of a service provider, or a service classification of the data service.

4. The method according to claim 2 wherein the second property includes an address of the second data service; the third property includes a list of addresses to referenced content; and
   wherein the second property indicates that the content requested in the second request for data is related to the content indicated by the third property if the address of the second data service is included in the list.

5. The method according to claim 4 wherein the condition further comprises that the time difference between the request for the first data service and the request for the second data service does not exceed a threshold value.

6. The method according to claim 1, wherein the performing the inspection is performed only when the received request for the first data service conforms to a defined traffic characteristic.

7. The method according to claim 1, wherein the performing the inspection is performed based on a mechanism randomly selecting a user or request to inspect.

8. The method according to claim 1 wherein the first property includes a first time stamp of the request for the first data service and the second property includes a second time stamp of the request for the second data service, and wherein the condition comprises:
   a difference between the first and second time stamp is less than a threshold value; and/or
   a traffic characteristic of the request for the first and second data services conforms to a defined traffic pattern.

9. The method according to claim 8 wherein the condition further comprises that the threshold value is between 50-200 milliseconds and that the defined traffic pattern is a burst of requests.

10. The method according to claim 8 wherein the charging is initiated based on an address of the first data service included in the first property, and the first time stamp.

11. The method according to claim 1 wherein the determining that the second data service is to be charged as the subordinate service of the first data service is performed only if the first and/or second property indicates that the requested data service relates to one or more of an image, cascading style sheets, video or javascript resource.

12. A service aware charging controller for enabling service aware charging of access to a data service in a communication network comprising:
- a processor;
- a memory comprising instructions that, when executed by the processor, cause the processor to perform operations comprising:
  - receiving a request for a first data service;
  - determining a first property of the request for the first data service;
  - initiating charging of the first data service using the first property;
  - receiving a request for a second data service;
  - selecting between a packet inspection for the request for the second data service and a heuristic inspection for the request for the second data service, wherein the packet inspection comprises analyzing a response message received in response to the request for the first data service and analyzing the response message to detect the occurrence of referenced content requested in the request for the second data service, and wherein the heuristic inspection comprises determining that a time difference between the request for the first data service and the request for the second data service does not exceed a threshold value;
  - determining, based on the selected heuristic inspection or the selected packet inspection, that the second data service is to be charged as a subordinate service of the first data service; and
  - initiating charging of the second data service as a subordinate service of the first data service.

13. The service aware charging controller according to claim 12 wherein the operations further comprise:
- determining a first property of the request for the first data service including performing an inspection of the content of the request for the first data service;
- receiving a response message from the requested first data service; and
- analyzing said response message to detect the occurrence of referenced content and determining a third property of the detected referenced content;
- wherein the condition comprises that the second property indicates that the content requested in the second request for data service is related to the content indicated by the third property.

14. The service aware charging controller according to claim 13,
- wherein the initiation of charging of the first and/or second data services includes a uniform resource indicator of a service provider, or a service classification of the data service.

15. The service aware charging controller according to claim 13,
- wherein the second property includes an address of the second data service;
- wherein the third property includes a list of addresses to referenced content; and
- wherein the second property indicates that the content requested in the second request for data is related to the content indicated by the third property if the address of the second data service is included in the list.

16. The service aware charging controller according to claim 15,
- wherein the condition further comprises that the time difference between the request for the first data service and the request for the second data service does not exceed a threshold value.

17. The service aware charging controller according to claim 12,
- wherein performing an inspection is performed only when the received request for a first data service conforms to a defined traffic characteristic.

18. The service aware charging controller according to claim 12,
- wherein the performing the inspection is performed based on a mechanism randomly selecting a user or request to inspect.

19. The service aware charging controller according to claim 12,
- wherein the first property includes a first time stamp of the request for the first data service and the second property includes a second time stamp of the request for the second data service, the condition comprises that:
- the difference between the first and second time stamp is less than a threshold value; and/or
- a traffic characteristic of the request for the first and second data services conforms to a defined traffic pattern.

20. The service aware charging controller according to claim 19,
- wherein the condition further comprises that the threshold value is between 50-200 milliseconds and that the defined traffic pattern is a burst of requests.

21. The service aware charging controller according to claim 19,
- wherein the charging is initiated based on an address of the first data service included in the first property, and the first time stamp.

22. The service aware charging controller according to claim 12,
- wherein the determining that the second data service is to be charged as a subordinate service of the first data service is performed only if the first and/or second property indicates that the requested data service relates to one or more of an image, cascading style sheets, video or javascript resource.

23. The method according to claim 1, wherein the selecting between a packet inspection for the request for the second data service and a heuristic inspection for the request for the second data service is based on a traffic characteristic of data in the data service of the communication network.

* * * * *